United States Patent
Pasca

(10) Patent No.: US 9,811,503 B1
(45) Date of Patent: Nov. 7, 2017

(54) METHODS FOR IMPLEMENTING ARITHMETIC FUNCTIONS WITH USER-DEFINED INPUT AND OUTPUT FORMATS

(71) Applicant: Altera Corporation, San Jose, CA (US)

(72) Inventor: Bogdan Pasca, Chesham (GB)

(73) Assignee: Altera Corporation, San Jose, CA (US)

( * ) Notice: Subject to any disclaimer, the term of this patent is extended or adjusted under 35 U.S.C. 154(b) by 304 days.

(21) Appl. No.: 14/608,113

(22) Filed: Jan. 28, 2015

(51) Int. Cl.
*G06F 17/10* (2006.01)
*G06F 17/17* (2006.01)

(52) U.S. Cl.
CPC .................................. *G06F 17/17* (2013.01)

(58) Field of Classification Search
CPC . G06F 1/03; G06F 17/10; G06F 17/17; G06F 2207/5354; G06F 2207/5355
See application file for complete search history.

(56) References Cited

U.S. PATENT DOCUMENTS

| | | | |
|---|---|---|---|
| 5,060,182 A | 10/1991 | Briggs et al. | |
| 5,367,702 A * | 11/1994 | Mahant-Shetti | G06F 7/552 708/606 |
| 5,506,797 A | 4/1996 | Koshiba | |
| 5,655,133 A | 8/1997 | Dupree et al. | |
| 6,137,542 A * | 10/2000 | Van Mourik | G09G 3/20 348/674 |
| 6,144,945 A | 11/2000 | Garg et al. | |
| 6,223,192 B1 * | 4/2001 | Oberman | G06F 7/53 708/270 |
| 6,260,054 B1 * | 7/2001 | Rosman | G06F 1/035 708/502 |
| 8,453,084 B2 | 5/2013 | Markov et al. | |
| 2009/0300088 A1 * | 12/2009 | Michaels | G06F 1/03 708/276 |
| 2011/0193610 A1 * | 8/2011 | Longhurst | G09G 3/20 327/334 |
| 2012/0197955 A1 * | 8/2012 | Brunelli | G06F 17/10 708/446 |
| 2013/0339564 A1 * | 12/2013 | Nogueira | G06F 13/36 710/305 |

* cited by examiner

*Primary Examiner* — Tan V. Mai
(74) *Attorney, Agent, or Firm* — Treyz Law Group, P.C.; Jason Tsai

(57) ABSTRACT

Methods for implementing fixed-point functions with user-defined input/output ranges and formats on a programmable integrated circuit are provided. A particular function may include one or more input intrusion intervals where generic fixed-point approximation methods are not sufficiently precise. Output values for these intrusion intervals may be pre-computed during function generation time using a mathematical library running on a computer-aided design tool and stored in a lookup table. During normal operation of the integrated circuit, a multiplexing network may be used to select among values generated by generic approximation methods and values obtained from one or more lookup tables depending on the current input to the function.

19 Claims, 6 Drawing Sheets

METHODS FOR IMPLEMENTING ARITHMETIC FUNCTIONS WITH USER-DEFINED INPUT AND OUTPUT FORMATS

BACKGROUND

This invention relates to performing arithmetic operations in integrated circuits and more particularly to ways of implementing fixed-point functions with user-defined input and output formats.

As system computing requirements for different applications continue to increase, integrated circuits such as programmable logic devices (PLDs), which offer increased flexibility in computing, are often used over competing technologies. Programmable integrated circuits can efficiently combine number formats and offer various customization options for different types of arithmetic operations.

As an example, programmable logic devices can be configured to support, for floating-point arithmetic operations, non-standard-number formats (i.e., exponent and fraction pairs), non-standard computing stages (e.g., custom arithmetic compiler stages), non-standard exception handling, application-specific components such as a custom accumulator, and various user-selectable implementation trade-offs. As another example, programmable logic devices can also be configured to support, for fixed-point arithmetic operations, user-defined input and output number formats, custom input and output value ranges, and various user-selectable implementation tradeoffs.

A substantial amount of research has been done on implementing functions that receive normalized inputs. However, not all inputs are normalized. In response to receiving non-normalized inputs, such inputs need to be normalized prior to performing the intended computation. The additional step of normalizing a non-normalized input requires circuitry for counting leading zeros and performing left shifts. Once the desired computation has been performed on the normalized input, the corresponding result also needs to be denormalized, which requires circuitry for performing right shifts. Such type of shifting circuits and leading-zero counters are, however, very expensive, especially for fixed-point computing. Moreover, functions with asymptotic behaviors tend to behave unpredictably for inputs in the asymptotic input range.

SUMMARY

The present invention relates to integrated circuits having improved fixed-point arithmetic operation capabilities. An integrated circuit may include computing circuitry configured to implement a desired fixed-point function, where the computing circuitry includes a generic approximation circuit that generates output values for the function, memory for storing a table of pro-computed output values for the function, and a multiplexing circuit that receives the output values from the generic approximation circuit, that receives the pre-computed values from the table in the memory, and that is configured to route output values from a selected one of the generic approximation circuit and the table to its output.

The generic approximation circuit may be configured to implement a generic approximation method selected from one of: the Newton-Raphson approximation method, the Taylor polynomial approximation method, the least-square polynomial approximation method, the Chebychey polynomial approximation method, and/or other suitable numerical approximation approaches.

The function may have a user-specified input range and output range. The pre-computed output values in the table may correspond to input values within an intrusion interval in the input range for which the generic approximation method is incapable of generating sufficiently precise output values.

The multiplexing circuitry may receive output values from more than one generic approximation circuit and from multiple tables associated with different intrusion intervals. The computing circuitry may also include index offsetting circuits for offsetting to zero the address signals to each table. The computing circuitry may further include an address encoding circuit that receives an input to the function and that generates corresponding control signal that controls how the multiplexing circuit performs its routing.

Further features of the invention, its nature and various advantages, will be more apparent from the accompanying drawings and the following detailed description of the preferred embodiments.

DETAILED DESCRIPTION

Embodiments of the present invention relate to performing fixed-point arithmetic operations in integrated circuits and, more particularly, to methodologies for implementing fixed-point functions with user defined input and output formats.

As described above, shifters and leading-zero counters are costly to implement, and as a result, it may be desirable to implement fixed-point functions without normalizing the function inputs. This can be achieved by assuming that generic function approximation methods such as the Taylor series approximation method and the Newton-Raphson approximation method will be sufficiently accurate for a substantial sub-range of inputs while remaining input ranges are handled using a table of pre-computed values.

Such fixed-point arithmetic circuitry may be configured at function generation time to dynamically identify one or more input ranges for which the approximation method(s) is not sufficiently accurate. The function values for these subintervals may be computed (by taking into account any user-defined output format) and stored in a look-up table. During normal operation, a multiplexing circuit that is part of the arithmetic circuitry may be configured to output function values based on the look-up table when the input is within one of the identified subintervals or to output values based on the approximation method(s) for other input levels.

It will be obvious to one skilled in the art, that the present exemplary embodiments may be practiced without some or all of these specific details. In other instances, well-known operations have not been described in detail in order not to unnecessarily obscure the present embodiments.

Fixed-point arithmetic functions are often implemented on programmable integrated circuits such as programmable logic devices (PLDs). Compared to application-specific non-reconfigurable integrated circuits, programmable integrated circuits offer computing flexibility by allowing users to define input and output number formats/ranges and to select among various implementation tradeoffs.

Figure 1:
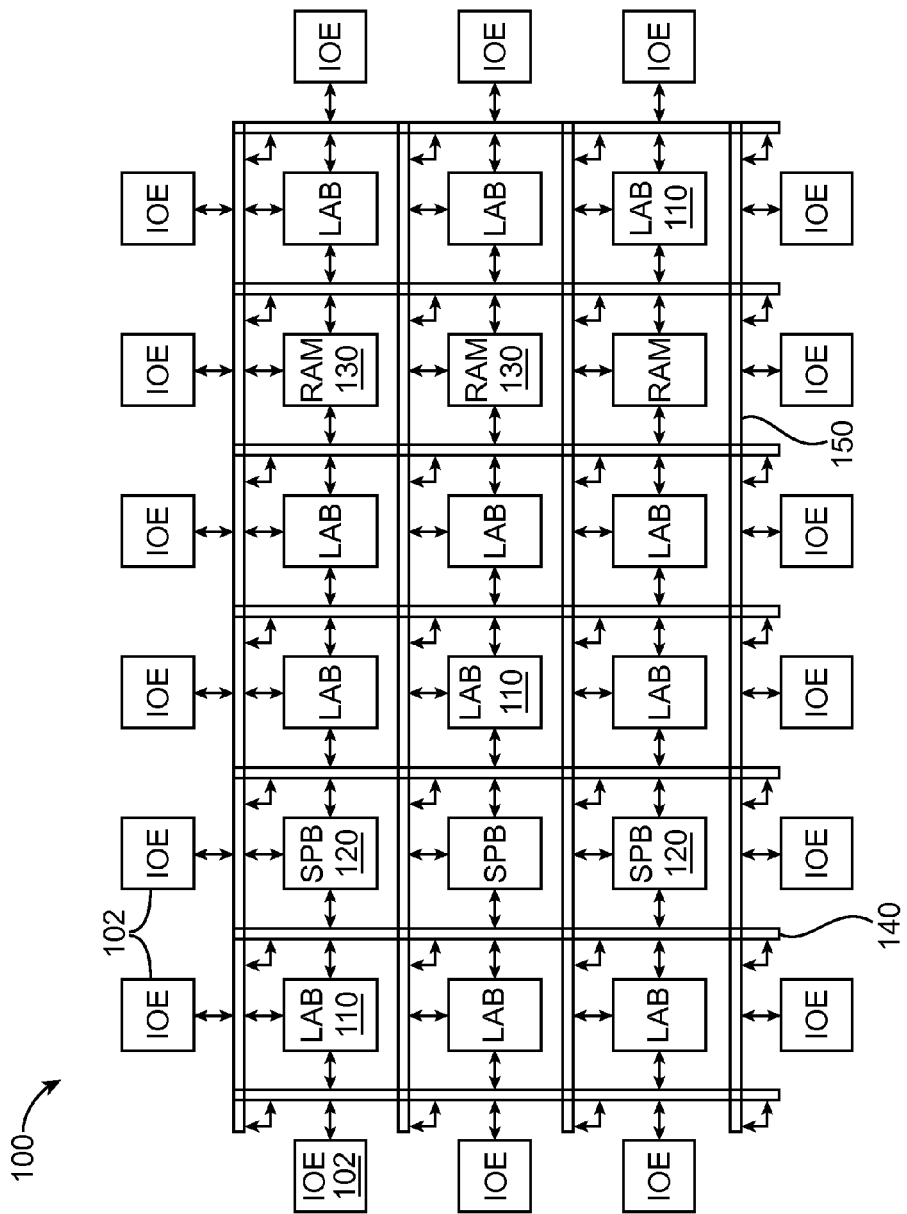
FIG. 1 is a diagram of an illustrative integrated circuit in accordance with an embodiment of the present invention.

An illustrative embodiment of an integrated circuit such as programmable logic device (PLD) 100 that can be used to implemented fixed-point arithmetic functions is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and configurable specialized processing blocks such as specialized processing blocks (SPB) 120, for example. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, SPB 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with. configuration data during programming, the memory elements are sometimes referred to as configuration memory, configuration RAM (CRAM), configuration memory elements, or programmable memory elements.

In addition, the programmable logic device may have input/output elements (IOEs) 102 for driving signals off of PLD and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include double data rate interconnections and/or single data rate interconnections.

Note that other routing topologies, besides the topology of the interconnect circuitry depicted in FIG. 1, are intended to be included within the scope of the present invention. For example, the routing topology may include diagonal wires, horizontal wires, and vertical wires along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments of the present invention may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figures 2, 3:
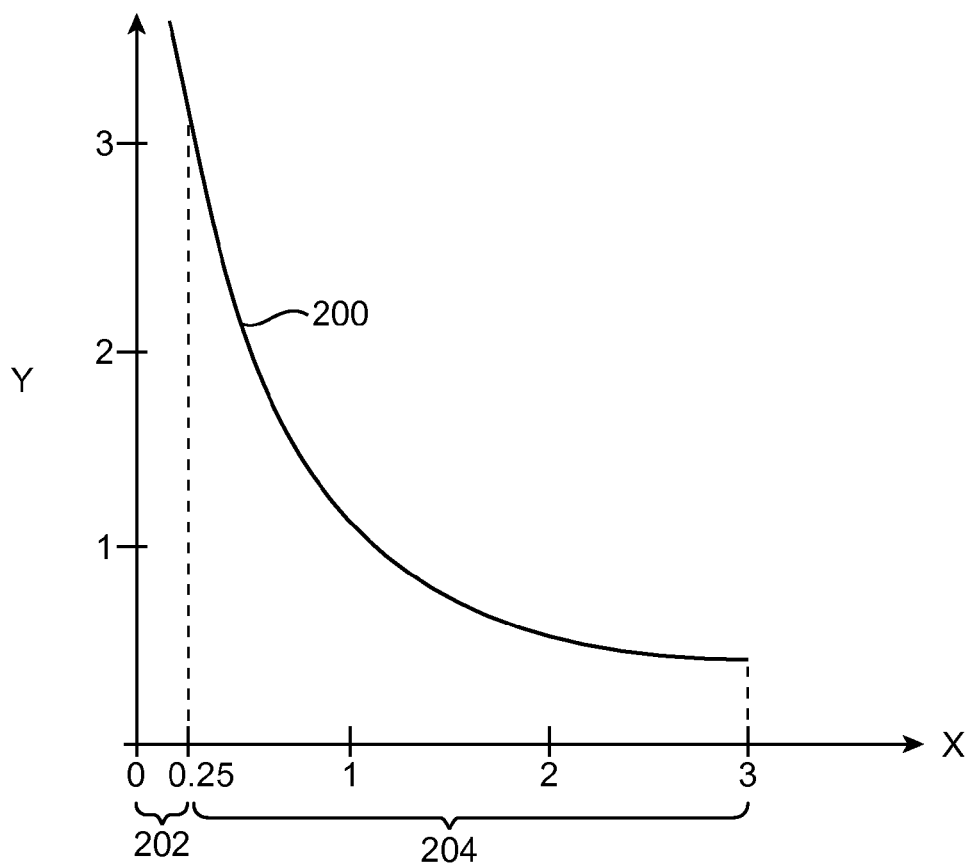
FIG. 2 is a plot of an illustrative function with an asymptotic behavior in accordance with an embodiment of the present invention.
FIG. 3 is an illustrative table of values that be used for input ranges where general approximation methods are not sufficiently precise in accordance with an embodiment of the present invention.

FIG. 2 is a plot of an illustrative function y see, curve 200) having an asymptotic behavior. The function of FIG. 2 may be a rational function such as $y=1/x$. Suppose, for example, that a user specifies an input range from zero to three inclusive (i.e., $x \in [0,3]$), an input format composed of two integer bits and two fractional bits the input.. value has two integer bits before the radix point and three integer bits after the radix point), an output range from zero to three inclusive (i.e., $y \in [0,3]$), and an output format composed of two integer bits and two fractional (i.e., the output value has two integer bits before the radix point and two integer bits after the radix point). Assuming a binary numerical representation, the input value may therefore be one of [0, 0.125, 0.250, 0.375, . . . , 2.875, 3] while the output value may be one of [0, 0.25, 0.5, 0.75, . . . , 2.75, 3].

In the example of FIG. 2, generic approximation methods such as the Taylor series approximation method using a reduced number of terms (in order for the implementation to have a reasonably small size) may be sufficiently accurate for a portion 204 of the user-defined input range but may be insufficient for portion 202 of the input range corresponding to the asymptotic region of curve 200 (i.e., as input value x approaches zero). For the input range where generic approximation methods are not sufficiently precise, a table such as table 300 of FIG. 3 may be referred to.

As shown in table 300 of FIG. 3, an input value x of 0 (x='b00.0001, 0.125 (x='b00.001), and 0.25 (x='b00.010) may all be assigned an output value y of 3. Table 300 may simply be indexed by the two least significant bits (LSBs) of input x (as an example). Arranged in this way, function 200 of FIG. 2 may be implemented by using circuitry configured to generate output values based on some generic approximation method for that function when the input value is within input range 204 while referring to a table of precomputed values for that function when the input value is within potentially problematic input range 202.

The example of FIG. 2 in which curve has one vertical asymptote is merely illustrative and does not limit the scope of the present invention. In general, computing circuitry in accordance with one or more embodiments of the present invention may be configured to implement functions with two or more vertical asymptotes, with three or more vertical asymptotes, with five or more vertical asymptotes, etc. In such scenarios, a separate table of values may be obtained for each input region surrounding respective vertical asymptotes where generic numerical approximation methods exhibit unpredictable behavior. The input regions where the generic approximation methods may not be sufficiently accurate are sometimes referred to here as "intrusion" intervals. In general, intrusion intervals may be positioned at the edges of the user-defined input range, at the middle of the input range, or anywhere within the input range.

The particular implementation of a fixed-point function may be determined using computer-aided design (CAD) tools in a circuit design system during function generation time. CAD tools may be used to evaluate whether the function includes any problematic intervals that cannot be handled using generic approximation methods and to generate a list of predetermined values (e.g., a lookup table) corresponding to those problematic intervals.

Figure 4:
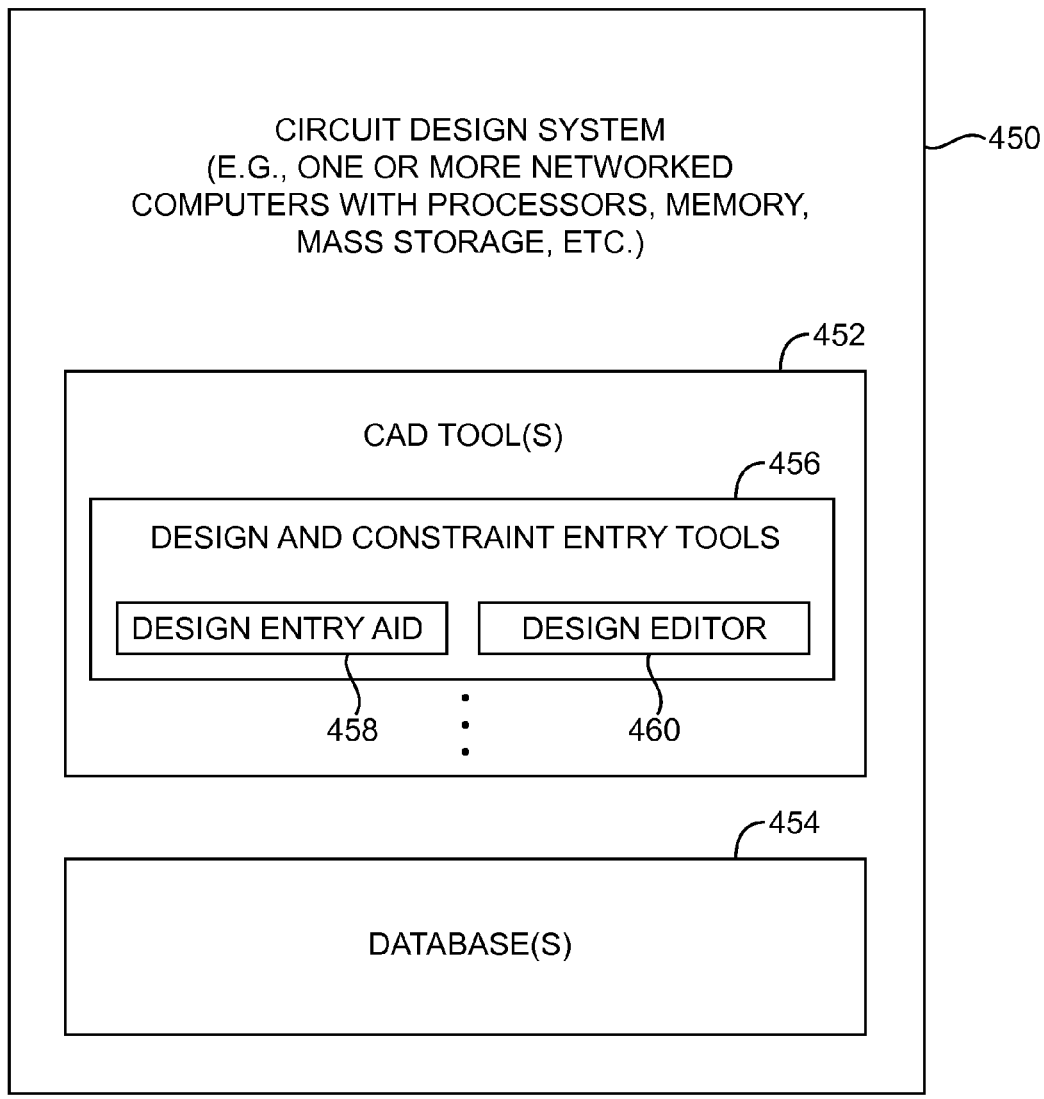
FIG. 4 is a diagram of a circuit design system that may be used to design integrated circuits in accordance with an embodiment of the present invention.

An illustrative circuit design system 450 in accordance with an embodiment is shown in FIG. 4. System 450 may be based on one or more processors such as personal computers, workstations, etc. The processor(s) may be linked using using a network (e.g., a local or wide area network). Memory in these computers or external memory and storage devices such as internal and/or external hard disks may be used to store instructions and data.

Software-based components such as computer-aided design tools 452 and databases 454 reside on system 450. During operation, executable software such as the software of computer aided design tools 452 runs on the processer(s) of system 450. Databases 454 are used to store data for the operation of system 450. In general, software and data may be stored on any computer-readable medium (storage) in system 450. Such storage may include computer memory chips, removable and fixed media such as hard disk drives, flash memory, compact discs (CDs), digital versatile discs (DVDs), blu-ray discs (BDs), other optical media, and floppy diskettes, tapes, or any other suitable memory or storage device(s). When the software of system 450 is installed, the storage of system 450 has instructions and data that cause the computing equipment in system 450 to execute various methods (processes). When performing these processes, the computing equipment is configured to implement the functions of the circuit design system.

The computer aided design (CAD) tools 452, some or all of which are sometimes referred to collectively as a CAD tool or an electronic design automation (EDA) tool, may be provided by a single vendor or by multiple vendors. Tools 452 may be provided as one or more suites of tools (e.g., a compiler suite for performing tasks associated with implementing a circuit design in a programmable logic device) and/or as one or more separate software components. Database(s) 454 may include one or more databases that are accessed only by a particular tool or tools and may include one or more shared databases. Shared databases may be accessed by multiple tools. For example, a first tool may store data for a second tool in a shared database. The second tool may access the shared database retrieve the data stored by the first tool. This allows one tool to pass information to another tool. Tools may also pass information between each other without storing information in a shared database if desired.

The design process may start with the formulation functional specifications of the integrated circuit design (e.g., a functional or behavioral description of the integrated circuit design). A circuit designer may specify the functional operation of a desired circuit design using design and constraint entry tools 456. Design and constraint entry tools 456 may include tools such as design and constraint entry aid 458 and design editor 460. Design and constraint entry aids such as aid 458 may be used to help a circuit designer locate a desired design from a library of existing circuit designs and may provide computer-aided assistance to the circuit designer for entering (specifying) the desired circuit design.

As an example, design and constraint entry aid 458 may be used to present screens of options for a user. The user may click on on-screen options to select whether the circuit being designed should have certain features. Design editor 460 may be used to enter a design (e.g., by entering lines of hardware description language code), may be used to edit a design of obtained from a library (e.g., using a design and constraint entry aid), or may assist a user in selecting and editing appropriate prepackaged code/designs.

Design and constraint entry tools 456 may be used to allow a circuit designer to provide a desired circuit design using any suitable format. For example, design and constraint entry tools 456 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 456 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 456 may allow the circuit designer to provide a circuit design to the circuit design system 450 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 460. Blocks of code may be imported from user-maintained or commercial libraries if desired.

In general, CAD tools 452 may include other components such as behavioral simulation tools, logic synthesis and optimization tools, placement and routing tools, analysis tools, and other design tools that are not described in detail herein in order to not unnecessarily obscure the present embodiments.

Figure 5:
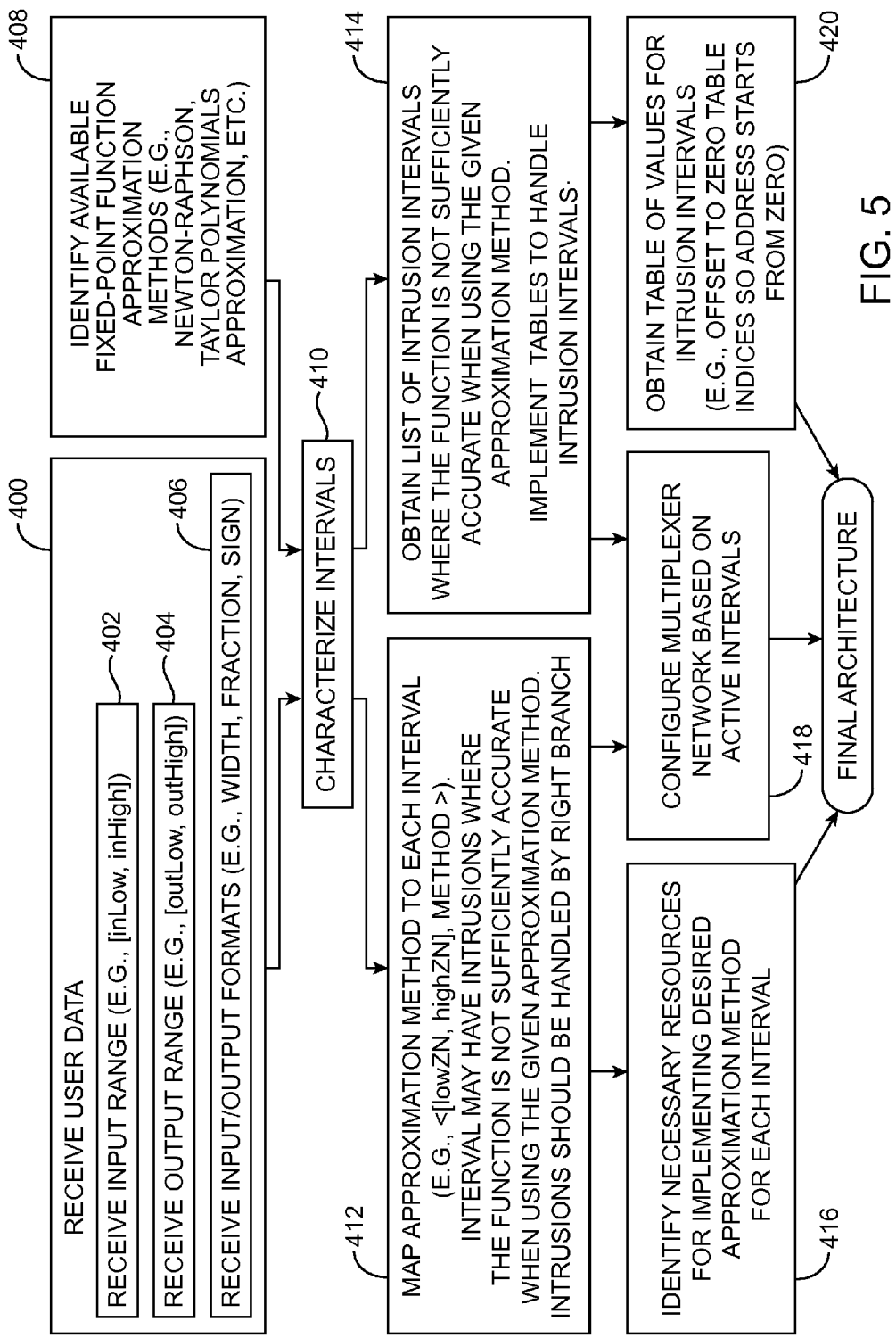
FIG. 5 flow chart of illustrative steps that can be performed by computer-aided design tools at function generation time to implement the desired function in accordance with an embodiment of the present invention.

FIG. 5 is a flow chart of illustrative steps that can be performed by tools 452 at function generation time to dynamically implement the desired function. At step 400, tools 452 may receive user data that specifies the input/output range and format for a particular fixed-point function to be implemented. For example, a user may specify an input range [inLow, inHigh] (see, step 402), an output range [outLow, outHigh] (see, step 404), and input/output fixed point formats such as the width, number of integer bits, number of fraction bits, use of a sign bit, and other formatting parameters for the input and output values (see, step 406).

At step 408, tools 452 may identify a list of available fixed-point function approximation methods that can be used to implement the desired function. The list of available numerical function approximation methods may include the Newton-Raphson approximation method, the Taylor polynomial approximation method, the least-square polynomial approximation method, the Chebychev polynomial approximation method, the Euler approximation method, linear interpolation/extrapolation approximation methods, just to name a few.

At step 410, tools 452 may be used to characterize the input range to determine whether the available approximation methods are suitable for computing the fixed-point function output values within the specified input range based on the information received at steps 400 and 408 (e.g., to determine whether there are any intrusion intervals within the input range during step 410).

In general, the input range may be partitioned into one or more intervals. At step 412, tools 452 may map a suitable approximation method to each of the partitioned intervals (e.g., each interval selected [lowZN, highZN] may be mapped to a selected method). For example, consider an example in which the input range is partitioned into first, second, and third separate intervals. The first interval may be assigned a first generic approximation method of a first type (e.g., the Newton-Raphson approximation approach); the second interval may be assigned a second generic approximation method of a second type that is different than the first type (e.g., the Taylor polynomial approximation approach); and the third interval may be assigned a third generic approximation method of a third type that is different than the first and second types (e.g., the least-square polynomial approximation approach).

At step 416, tools 452 may identify the necessary resources on the integrated circuit to be used for implementing the approximation method corresponding to each of the mapped intervals.

There may be regions within these intervals where the given approximation method is not sufficiently accurate. These regions, sometimes referred to as intrusion intervals, may be handled by the right branch (see, e.g., step 414).

At step 414, tools 452 may identify a list of intrusion intervals where the desired function is not sufficiently accurate when using the assigned approximation method. To handle these intrusion intervals, one or more tables of pre-computed output values may be generated and stored (step 420). These values may be computed using a mathematical library such as the GNU multiple-precision floating-point rounding (MPFR) library or other suitable mathematical library with well-defined semantics that is capable of computing outputs for a variety of mathematical and utility functions.

If desired, each table associated with each intrusion interval may have input indices that are offset to zero such that addressing starts from zero. For example, a table corresponding to an intrusion interval $[l_k, h_k]$ may be addressed by the input value offset by the lower bound of the intrusion. interval (i.e., that table may be addresaed by $(x-l_k)$).

At step 418, tools 452 may configure a multiplexing network that serves to select the correct output branch depending on the current input value x. In particular, the multiplexing network may be configured to pass through a value generated from the left branch (i.e., an output value generated by the corresponding approximation method) when input x is not within an intrusion interval and may further be configured to pass through a value generated from the right branch (i.e., an output value obtained from a pre-computed lookup table) when input x is within one of the identified intrusion intervals. Tools 452 may therefore be used in this way to generate a final arithmetic computing architecture that includes at least resources used to implement one or more generic approximation methods, memory for storing the tabulated values for the intrusion intervals, and associated-multiplexing circuitry for selecting between the approximated output and the pre-computed stored output.

Figure 6:
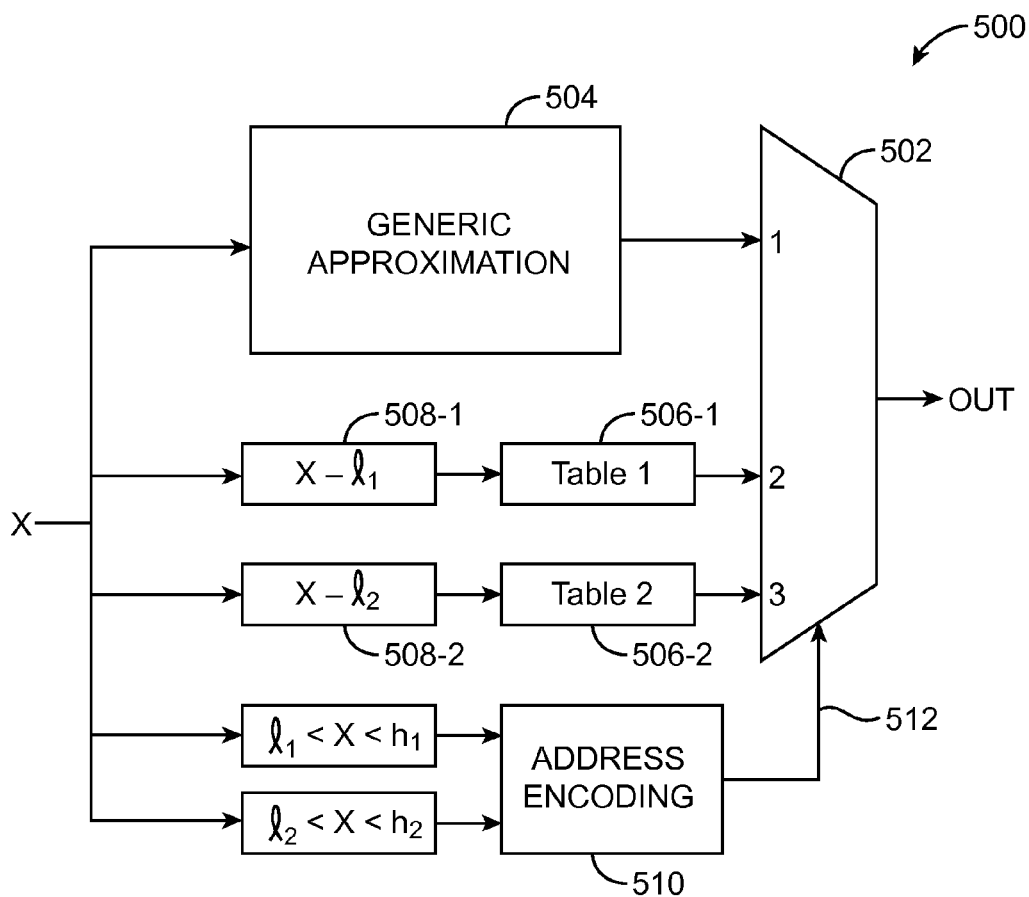
FIG. 6 is a diagram of illustrative computing circuitry having tables corresponding to two intrusion intervals in accordance with an embodiment of the present invention.
Figure 7:
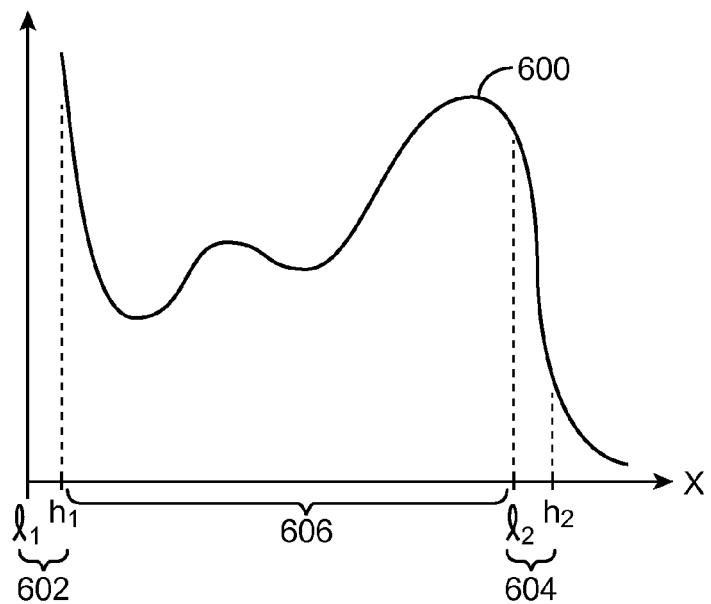
FIG. 7 is a plot of an illustrative function with two intrusion intrusions that can be implemented using the circuitry of FIG. 6 in accordance with an embodiment of the present invention.

FIG. 6 shows one suitable architecture that can be used to implement a function of the type shown in FIG. 7. As shown in FIG. 7, function 600 may have an input range that includes a first intrusion interval 602 (i.e., interval $[l_1, h_1]$), a second intrusion interval 604 (i.e., interval $[l_2, h_2]$), and a normal non-intrusion 606 that is interposed between the first and second intrusion intervals and that can be handled by a generic approximation method.

Referring back to FIG. 6, computing circuitry 500 may include a generic approximation circuit 504, a first lookup table 506-1, a second lookup table 506-2, a multiplexing circuit 502 that receives output signals from approximation circuit 504 and tables 506, and an associated addressing encoding circuit 510 for outputting control signals to multiplexing circuit 502 via path 512. Generic approximation circuit 504 be configured to implement a selected one of the available approximation methods. Generic approximation circuit 504 may receive x and produce corresponding output values for input interval 606.

Table 506-1 may include a first list of predetermined output values corresponding to intrusion interval 602, whereas table 506-2 may include a second list of predetermined output values corresponding to intrusion interval 604. Circuitry 500 may also include a first index offsetting circuit 508-1 associated with table 506-1 and a second index offsetting circuit 508-2 associated with table 506-2. Circuit 508-1 may serve to offset input x by the lower bound of the first intrusion interval 602 to generate an address signal for table 506-1 (e.g., circuit 508-1 receives input x and outputs $(x-l_1)$). Circuit 508-2 may serve to offset input x by the lower bound of the second intrusion interval 604 to generate an address signal for table 506-2 (e.g., circuit 508-2 receives input x and outputs $(x-l_2)$).

In the example of FIG. 6, multiplexing circuit 502 may have a first input that receives output signals from generic approximation circuit 504, a second input that receives output signals from table 506-1, a third input that receives output signals from table 506-2, an output, and a control input that receives control signals from address encoding circuit 510. Depending on the value of the control signals, multiplexer 502 may be configured to route signals from a selected one of the first, second, and third inputs to its output.

In particular, address encoding circuit 510 may be configured to output a first value if x is within the first intrusion interval 602 (i.e., if $l_1 < x < h_1$), a second value that is different than the first value if x is within the second intrusion interval 604 (i.e., if $l_2 < x < h_2$), and a third value that is different than the first and second values when x is outside of the first and second intrusion intervals (i.e., when x is in interval 606). Configured in this way, multiplexer 502 will select the appropriate input branch to pass on to its output depending on the current value of x.

The exemplary configuration of FIG. 6 in which circuitry 500 includes one generic approximation circuit and two lookup tables is merely illustrative and does not serve to limit the scope of the present invention. In general, an integrated circuit may include computing circuitry such as computing circuitry 700 of FIG. 8 that includes any suitable number of generic approximation circuits 704, any suitable number of pre-computed lookup tables 706, and associated multiplexing circuitry that is capable of selecting among circuits 704 and tables 706.

Figure 8:
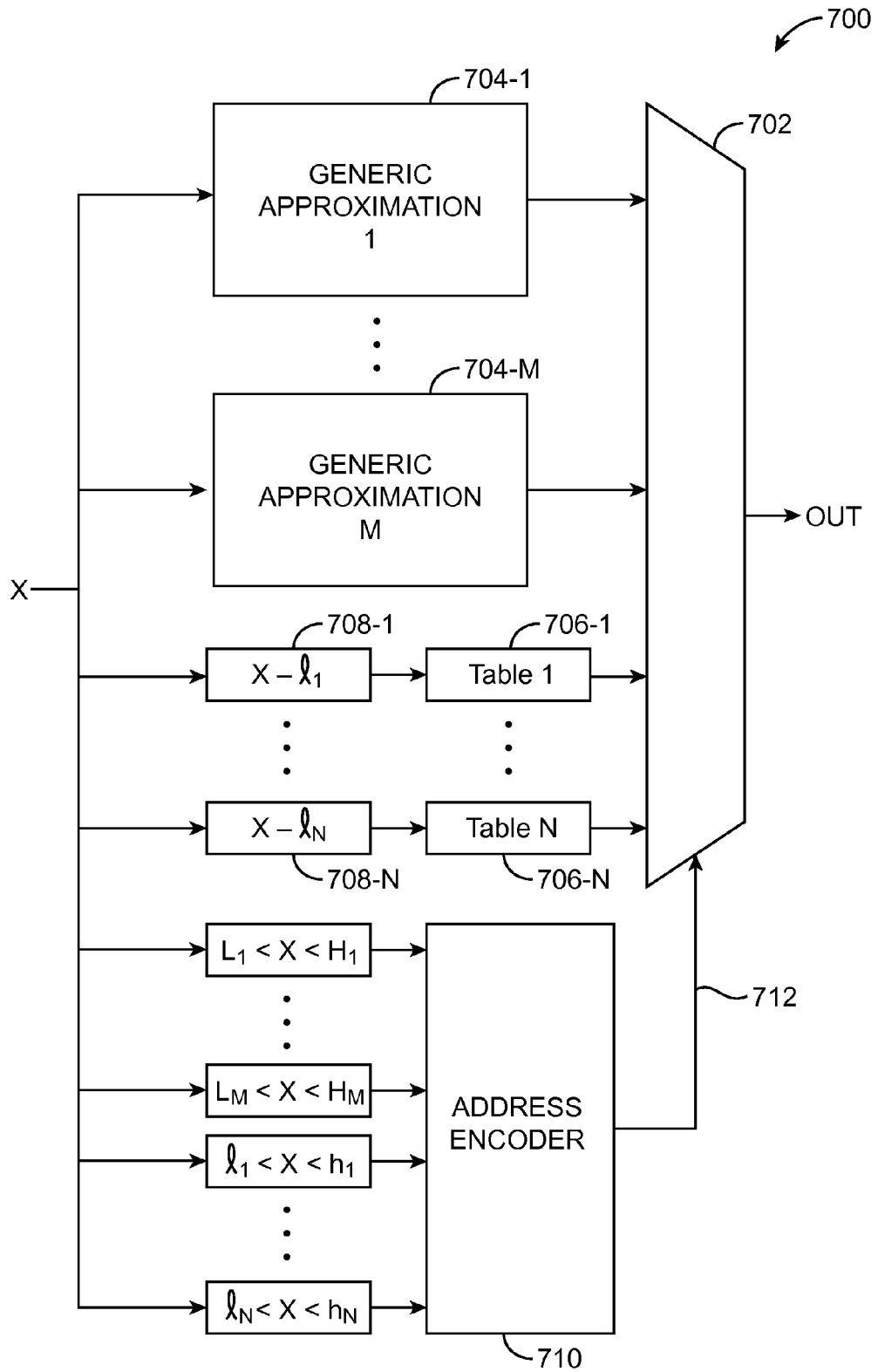
FIG. 8 is a diagram of illustrative computing circuitry that can be configured to implement a function with N intrusion intervals and to support M different approximation methods for that function in accordance with an embodiment of the present invention.

As shown in FIG. 8, computing circuitry 700 may include M generic approximation circuits 704 (e.g., circuits 704-1 . . . 704-M), N separate lookup tables 706 (e.g., tables 706-1 . . . 706-N), a multiplexing circuit 702 that receives output signals from approximation circuits 704 and tables 706, and an associated addressing encoding circuit 710 for outputting control signals to multiplexing circuit 702 via path 712. Each generic approximation circuit 704 may receive input x and serve to generate output values for a respective one of the non-intrusion intervals based on a selected one of the available approximation methods assigned during step 412 (FIG. 5).

Each of tables 706 may receive address signals from an associated index offsetting circuit 708. For example, table 706-1 may receive address signals from circuit 708-1 that serves to offset input x by the lower bound of a first intrusion interval (e.g., circuit 708-1 receives input x and outputs $(x-l_1)$), whereas table 706-N may receive address signals from circuit 708-N that serves to offset input x by the lower bound of a $N^{th}$ intrusion interval (e.g., circuit 708-N receives input x and outputs $(x-l_N)$).

In the example of FIG. 8, multiplexing circuit 702 may have a first set of inputs that receives output signals from generic approximation circuits 704, a second set of inputs that receives output signals from tables 706 (e.g., multiplexer 702 may have M+N data inputs), an output, and a control input that receives control signals from address encoding circuit 710. Depending on the value of the control signals, multiplexer 702 may be configured to route signals from a selected one of its (M+N) data inputs to its output. Variables M and N can be any suitable integer that is equal to or greater than one.

In particular, address encoding circuit 710 may be configured to output a first value if x is within the first intrusion interval (i.e., if $l_1 < x < h_1$), . . . , a second value that is different than the first value if x is within the $N^{th}$ intrusion interval (i.e., if $l_N < x < h_s$), yet other different values when x is within the other N−2 intrusion intervals (if any), a third value that is different than the first and second values when x is within a first non-intrusion interval associated with the first generic approximation method (i.e., when $L_1 < x < H_1$), a fourth value that is different than the first, second, and third values when x is within an $M^{th}$ non-intrusion interval associated with the $M^{th}$ generic approximation method (i.e., when $L_N < x < H_M$), and yet other different values when x is within the other M−2. non-intrusion intervals (if any). Configured in this way, multiplexer 702 will select the appropriate input branch to pass on to its output depending on the current value of x.

The embodiments described herein are directed towards fixed-point arithmetic functions. If desired, these techniques may also be extended to floating-point arithmetic functions without loss of generality.

The method and apparatus described herein may be incorporated into any suitable integrated circuit or system of integrated circuits. For example, the method and apparatus may be incorporated into numerous types of devices such as microprocessors or other ICs. Exemplary ICs include programmable array logic (PAL), programmable logic arrays (PLAs), field programmable logic arrays (FPLAs), electrically programmable integrated circuits (EPLDs), electrically erasable programmable integrated circuits (EEPLDs), logic cell arrays (LCAs), field programmable gate arrays (FPGAs), application specific standard products (ASSPs), application specific integrated circuits (ASICs), just to name a few.

The integrated circuit described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. Circuitry configured to implement a function, comprising:
   a generic approximation circuit that generates output values for the function;
   memory for storing a table of pre-computed output values for the function, wherein the function comprises a fixed-point arithmetic function having an input range, and wherein the pre-computed output values in the table correspond to input values within the input range for which the generic approximation circuit is incapable of generating sufficiently accurate output values; and
   a multiplexing circuit that receives the output values from the generic approximation circuit, that receives the pre-computed output values in the table, and that is configured to route output values from a selected one of the generic approximation circuit and the table to a multiplexer output.

2. The circuitry defined in claim 1, wherein the generic approximation circuit comprises an approximation circuit selected from the group consisting of: a Newton-Raphson approximation circuit and a Taylor polynomial approximation circuit.

3. The circuitry defined in claim 2, further comprising:
an additional generic approximation circuit that generates output values for the function, wherein the multiplexing circuit also receives the output values from the additional generic approximation circuit.

4. The circuitry defined in claim 1, wherein the pre-computed output values in the table correspond to input values within an intrusion interval in the input range.

5. The circuitry defined in claim 1, further comprising:
additional memory that stores another table of pre-computed output values for the function, wherein the multiplexing circuit also receives the pre-computed output values from the another table.

6. The circuitry defined in claim 1, further comprising:
an index offsetting circuit that receives an input to the function and that outputs a corresponding signal for addressing the table.

7. The circuitry defined in claim 1, further comprising:
an address encoding circuit that receives an input to the function and that generates a corresponding control signal that configures the multiplexing circuit.

8. A method for operating computing circuitry to implement a function, the method comprising:
using a generic approximation circuit to generate output values for the function;
using memory to store a table of pre-computed output values for the function;
with a multiplexing circuit, receiving the output values from the generic approximation circuit and the pre-computed output values in the table and providing output values selected from one of the generic approximation circuit and the table; and
with an address encoder, receiving an input to the function and outputting a control signal to the multiplexing circuit.

9. The method defined in claim 8, wherein the computing circuitry is configured to implement a fixed-point function having a user-defined input range.

10. The method defined in claim 9, wherein using the memory to store the table of pre-computed output values comprises storing output values corresponding to input values within an intrusion interval in the input range.

11. The method defined in claim 10, further comprising:
with an index offsetting circuit, receiving an input to the function and outputting a corresponding signal for addressing the table in the memory.

12. The method defined in claim 11, wherein outputting the corresponding signal for addressing the table comprises computing a difference between the input and a lower bound of the intrusion interval.

13. The method defined in claim 8, wherein using the generic approximation circuit to generate output values for the function comprises using the generic approximation circuit to implement a selected one of: a Newton-Raphson approximation method, a Taylor polynomial approximation method, a least-square polynomial approximation method, and a Chebychev polynomial approximation method.

14. A method for using design tools running on computing equipment to implement a function on an integrated circuit, the method comprising:
with the design tools running on the computing equipment, receiving an input range for the function;
with the design tools running on the computing equipment, identifying a generic approximation method that is used to generate output values for the function in a portion of the input range; and
with the design tools running on the computing equipment, determining whether the input range includes an intrusion interval for which the generic approximation method exhibits insufficient accuracy.

15. The method defined in claim 14, further comprising:
generating a table of pre-computed output values for the intrusion interval.

16. The method defined in claim 15, further comprising:
identifying an additional generic approximation method that is different than the generic approximation method and that is used to generate output values for the function in another portion of the input range.

17. The method defined in claim 15, further comprising:
identifying an additional intrusion interval that is different than the intrusion interval; and
generating another table of pre-computed output values for the additional intrusion interval.

18. The method defined in claim 15, further comprising:
configuring a multiplexing network to route output signals obtained from a selected one of the generic approximation method and the table to a multiplexer output.

19. The method defined in claim 14, further comprising:
receiving an output range for the function; and
receiving input and output number formats for the function.

* * * * *